United States Patent [19]

Curtin

[11] 4,109,944
[45] Aug. 29, 1978

[54] PIPE COUPLING

[76] Inventor: Hoyt S. Curtin, 3706 Capstan Cir., Westlake, Calif. 91361

[21] Appl. No.: 695,462

[22] Filed: Jun. 14, 1976

Related U.S. Application Data

[63] Continuation-in-part of Ser. No. 537,093, Dec. 30, 1974, Pat. No. 3,971,574, which is a continuation-in-part of Ser. No. 329,727, Feb. 5, 1973, Pat. No. 3,857,588.

[51] Int. Cl.² .................... F16L 13/10; F16L 47/02
[52] U.S. Cl. ............................... 285/373; 285/156; 285/421; 285/423; 285/DIG. 16
[58] Field of Search ........... 285/419, 373, DIG. 22, 285/DIG. 16, 31, 421, 423, 156; 138/99

[56] References Cited

U.S. PATENT DOCUMENTS

| 2,403,839 | 7/1946 | Adolph | 285/419 X |
|---|---|---|---|
| 2,680,631 | 6/1954 | Smith | 285/419 X |
| 2,690,193 | 9/1954 | Smith | 138/99 |
| 3,186,744 | 6/1965 | Smith et al. | 285/373 |
| 3,229,998 | 1/1966 | Pennington | 285/419 |
| 3,456,965 | 7/1969 | Gajewski et al. | 285/419 X |
| 3,633,947 | 1/1972 | Nelson | 285/DIG. 22 X |
| 3,771,820 | 11/1973 | Hoss, Sr. et al. | 285/DIG. 16 X |

FOREIGN PATENT DOCUMENTS 2,037,950  2/1972  Fed. Rep. of Germany ... 285/DIG. 16

*Primary Examiner*—Thomas F. Callaghan
*Attorney, Agent, or Firm*—Lindenberg, Freilich, Hornbaker, Wasserman, Rosen & Fernandez

[57] ABSTRACT

A coupling for unthreaded pipes of a sprinkler system, which permits the replacement of a small damaged pipe section without bending the pipes already emplaced in the ground. The coupling is comprised of a pair of semi-cylindrical pipe sections adapted to fit around and engage the emplaced pipes. The longitudinal edges of the two semi-cylindrical pipe sections are formed so as to mate with one another to hold the sections together as an applied adhesive forms a water-tight seal.

7 Claims, 12 Drawing Figures

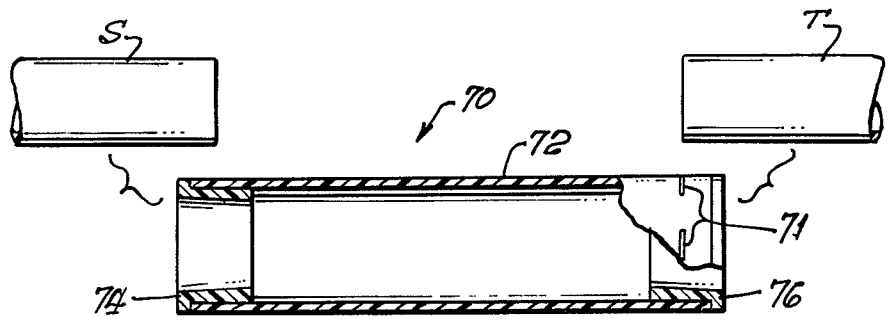
FIG.1.
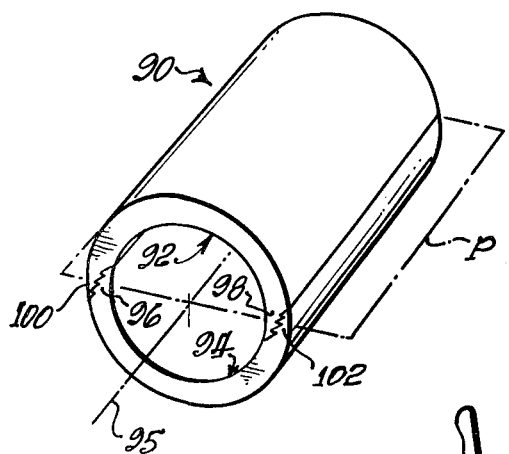
FIG.2.
FIG.3.
FIG.4.
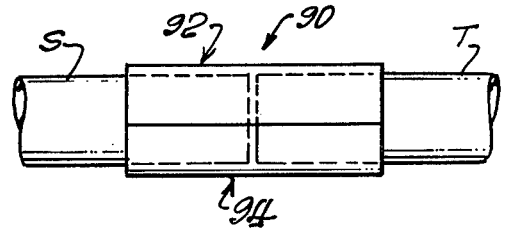
FIG.5.
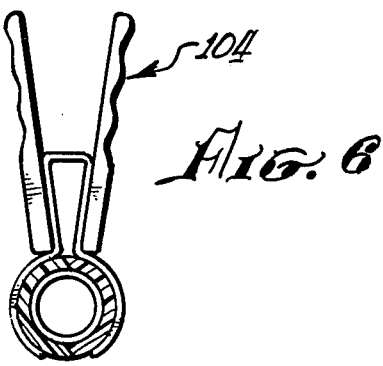
FIG.6.

PIPE COUPLING

RELATED APPLICATIONS

This application is a continuation-in-part of U.S. patent application Ser. No. 537,093, filed Dec. 30, 1974 (now U.S. Pat. No. 3,971,574, issued July 27, 1976), which in turn is a continuation-in-part of U.S. patent application Ser. No. 329,727 filed Feb. 5, 1973 now U.S. Pat. No. 3,857,588.

BACKGROUND OF THE INVENTION

This invention relates to pipe couplings, and more particularly to pipe couplings that are usable with unthreaded pipes.

Plastic pipes have become widely used in sprinkler systems because of their low cost and ease of connection and repair. Such pipes, commonly referred to as PVC pipes because of their typical polyvinyl chloride composition, may be joined without threading by applying an adhesive such as a solvent cement type to the ends of the pipes and slipping a smooth-bore coupling over the ends.

When a break occurs in an underground sprinkler system of the PVC type, it can be repaired by digging away the dirt over the break, cutting out a small section of pipe containing the break, and connecting a new section of pipe in place using a pair of couplings. In practice, however, great difficulty is encountered in installing the couplings. The couplings can be installed by bending the pipe in the ground far enough so that the gap between them is increased sufficiently to insert the pipes into the couplings, and then releasing the bent pipes so they return to their original straight confuguration. However, the dirt around a long section of the pipes may have to be removed to permit sufficient bending, which involves considerable labor and which may not be possible in certain locations. Also, the glue on the pipe may be scraped away while the pipe is fitted into the coupling. A coupling which could be installed without requiring large amounts of pipe bending would facilitate repairs in such sprinkler systems.

SUMMARY OF THE INVENTION

In accordance with one embodiment of the present invention, a pipe coupling is provided for use with unthreaded pipes, which provides a reliable connection without requiring bending of pipes that are fixed in position in the ground.

The coupling is formed from two semi-cylindrical pipe sections that can be brought together so as to engage and envelope the ends of pipes to be coupled. The semi-cylindrical pipe sections have mating longitudinal edges which hold the pipe sections in place while the cement applied thereto is drying to form a water-tight seal.

In a preferred embodiment of the invention, the two semi-cylindrical pipe sections are identical and have sawtooth surfaces formed along their mating longitudinal edges. A notch is formed at each end of one edge, while at each end of the other edge, a lug is formed. When the semi-cylindrical pipe sections are joined, the lugs on one section mate with the notches on the other section and vice versa. The interlocking lugs and notches thus provide surfaces upon which the applied adhesive can create a water-tight seal preventing leakage longitudinally along the pipe surface.

In still another embodiment of the invention, the coupling forms a "T" joint for the connection of three pipes. Here one of the semi-cylindrical pipe sections has an opening that projects perpendicular to the centerline of the two semi-cylindrical sections and is capable of accepting an unthreaded pipe to be solvent-cemented to the coupling.

In still another embodiment of the invention, a coupling is comprised of two identical semi-cylindrical sections held together by two keepers sliding along and gripping canted projections extending from, and running along, the longitudinal edges of each semi-cylindrical section.

The novel features of the invention are set forth with particularity in the appended claims. The invention will best be understood from the following description when read in conjunction with the accompanying drawings.

BRIEF DESCRIPTION OF THE DRAWINGS

FIG. 1 is a sectional side view of a coupling constructed in accordance with one embodiment of the invention;

FIG. 2 is a side elevation view of the coupling of FIG. 1, showing the manner in which it is installed on a pipe line;

FIG. 3 is a sectional side view of a coupling constructed in accordance with another embodiment of the invention;

FIG. 4 is a perspective view of a coupling constructed in accordance with yet another embodiment of the invention;

FIG. 5 is a side elevation view of the coupling of FIG. 4, showing it installed in a pipe line;

FIG. 6 is a sectional end view of the coupling of FIG. 4, showing how a clamp is applied to hold it together while cement thereon is drying;

DESCRIPTION OF THE PREFERRED EMBODIMENTS

Figure 7:
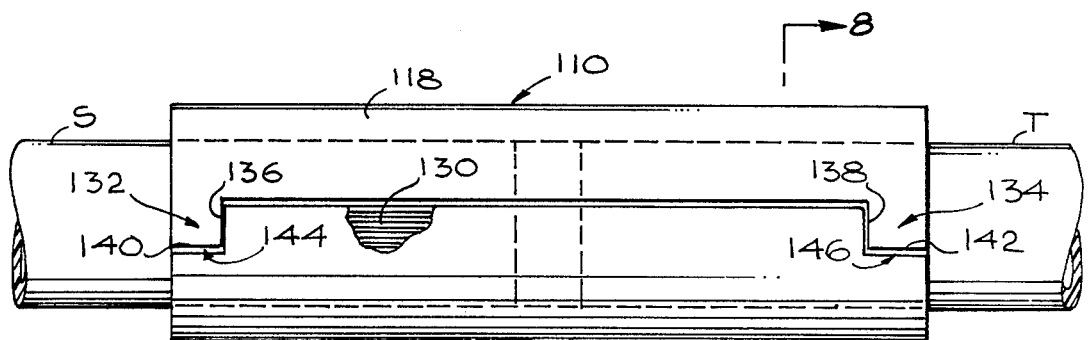
FIG. 7 is an elevation view of a coupling in accordance with yet another embodiment of the invention comprised of mating semi-cylindrical pipe sections.

FIGS. 1-6 hereof are identical to FIGS. 8-13 of U.S. patent application Ser. No. 537,093, filed Dec. 30, 1974, which in turn is a continuation-in-part of U.S. Pat. No. 3,857,588.

FIGS. 1 and 2 illustrate a coupling 70 constructed in accordance with an embodiment of the invention, which utilizes a highly flexible sleeve 72 and a pair of substantially rigid inserts 74, 76 at the ends of the sleeves. The sleeve 72 has sufficient flexibility so that it can be readily deformed by a person to the configuration illustrated in FIG. 2, to thereby shorten the length between the ends of the coupling. A variety of material such as vinyl with considerable plasticizer can be utilized to achieve much flexibility. The sleeve 72 cannot be readily used alone because solvent cement, which is the most common type utilized in PVC sprinkler pipe repair, requires considerable time to bond to suitable highly-flexible material. While the common more rigid PVC pipes can be bonded together with solvent cement in a time less than about 20 minutes, bonding of such rigid PVC to the highly flexible vinyl can require hours. The inserts 74, 76 minimize the bonding time, inasmuch as the inserts are constructed of ordinary rigid PVC. Also, the inserts are internally tapered to facilitate joining to another pipe. The inserts 74, 76 are installed, as with solvent cement, at the factory so that the longer bonding time is not a highly significant factor. A repairman installs the coupling 70 to replace a damaged pipe section, by cutting out the damaged section to leave two pipe ends S and T. The coupling 70 is provided with markings 71 near either end thereof to serve as a guage that indicates the required gap length. The repairman coats the ends of the pipes S and T and the insides of the inserts 74, 76 with solvent cement and then inserts one pipe T into one insert 76. He then deforms the sleeve 72 as to the configuration illustrated at 72a in FIG. 2 with his thumbs $T_R$ and $T_L$ and forefingers $F_R$ and $F_L$ to reduce the length of the coupling. The shortened coupling can then be inserted into the other pipe S and allowed to return to its cylindrical shape, so that it becomes longer while receiving the other pipe end S.

FIG. 3 illustrates a coupling 80 constructed in accordance with yet another embodiment of the invention wherein a flexible sleeve 82 is utilized in conjunction with end inserts 84, 86 of harder material, in which the flexible sleeve is formed with a bellows portion 88. The flexible sleeve and inserts are of material similar to those described in the coupling of FIGS. 8 and 9. The bellows portion 80 makes compression of the length of the sleeve even easier.

FIGS. 4–6 illustrate a still further embodiment of the invention, wherein the coupling 90 includes a pair of semi-cylindrical parts 92, 94 that can be fitted together over the ends of pipes S, T. The two parts 92, 94 are identical, and each extend slightly more than 180° and has serrated sides 96, 98, or 100, 102. Each part 92, 94 is substantially one of the halves of a pipe cut along an imaginary plane P that extends through the axis 95 of the pipe. The serrated sides of the two parts interfit and serve to hold the parts together while solvent cement dries thereon. Both parts may be constructed of an ordinary largely rigid vinyl that can be rapidly solvently cemented to PVC pipes. The coupling 90 is installed by applying solvent cement to the serrated sides 96-102 of the semi-cylindrical parts, as well as to the inside surfaces thereof and to the outside surfaces of the ends of the pipes S and T. The two coupling parts 92, 94 are then placed on opposite sides of the pipes and pressed together so that their serrated sides 96-102 interfit. The coupling parts can be even more securely held together by means of a clamp 104 illustrated in FIG. 6 which is removed after the solvent cement has at least partially dried.

Figure 8:
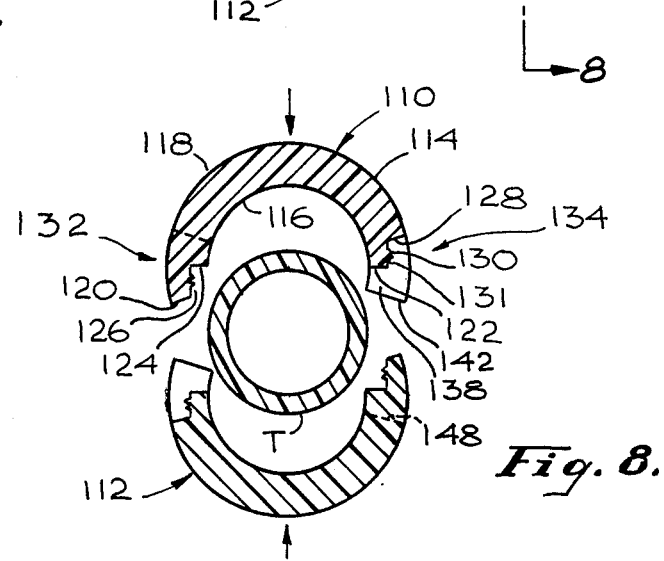
FIG. 8 is a sectional view taken substantially along plane 8—8 of FIG. 7 showing the semi-cylindrical pipe sections separated.

Attention is now called to FIGS. 7 and 8 which illustrate a further embodiment of the invention similar to that depicted in FIGS. 4–6 but differing therefrom in the shape of the opposing surfaces of the two semi-cylindrical parts. In the embodiment of FIGS. 7 and 8, the two parts 110 and 112 are configured so as to automatically interlock relative to one another when they are squeezed around the emplaced pipes S and T to be repaired.

The semi-cylindrical pipe sections 110 and 112 are identical and each is formed by a wall 114 having inner and outer semi-cylindrical surfaces, 116 and 118, and first and second longitudinal edges 120 and 122. A shoulder 124 is formed proximate to the longitudinal edge 120 and extends between the inner surface 116 and an exposed surface 126. A shoulder 128 is formed proximate to the longitudinal edge 122 and extends between the outer surface 118 and an exposed surface 130. The exposed surfaces 126 and 130 extend substantially parallel to one another and preferably lie on a tangent to a concentric circular path about the common axis of the pipe sections. A series of serrations or teeth 131 are formed on the exposed surfaces 126 and 130.

The wall 114 of pipe section 110, as can best be seen in FIG. 7, is shaped to define lugs 132 and 134 adjacent each end of the pipe section edge 122. More particularly, the surface 130 of pipe section 110 extends to and terminates at shoulders 136 and 138 which shoulders define the inner boundaries of the lugs. The lugs 132 and 134 respectively have terminal surfaces 140 and 142 extending parallel to the axis of the pipe sections and perpendicular to the shoulders 136 and 138 respectively. As can best be seen in FIG. 7, the surface 142 extends beyond the longitudinal edge 122.

Whereas projecting lugs 132 and 134 are formed adjacent the ends of exposed surface 130, notches 144 and 146 are formed in the pipe section adjacent the ends of exposed surface 126 along edge 120. Notch 145, for example, is defined by shoulder 147 adapted to abut lug shoulder 138 and surface 148 adapted to abut lug surface 142. It will be recognized of course that the peripheral arcuate path of each pipe section exceeds 180° so as to permit the exposed serrated surfaces of the pipe sections 110 and 112 to overlap.

In the use of the coupling of FIGS. 7 and 8, solvent cement is first applied to surfaces 120, 126, 124, 116, 122, 130 and 128 of both parts 110 and 112, as well as along the end portion of the exterior surfaces of the emplaced pipes S and T. Parts 110 and 112 are then placed around the emplaced pipes S and T, as depicted in FIG. 15, so that the lugs 132 and 134 of part 110 align with the notches of the mating part 112 while the notches of part 110 align with the lugs of part 112.

Finally, the parts 110 and 112 are squeezed together so that the teeth 131 of the mating surfaces 126 and 130 interlock and firmly hold parts 110 and 112 in place while the solvent cement cures. Because the surfaces 126 and 130 extend substantially parallel to one another and because multiple teeth are provided on these surfaces, the pipe sections 110 and 112 are able to accommodate slightly oversized emplaced pipes S and T while still properly interlocking. It should be noted that when interlocked, the lug surface 142 abuts the notch surface 148 along a plane displaced from the boundary plane between longitudinal edge 122 and shoulder 124. Thus, the adhesive applied to the interlocking surfaces of the lugs and notches forms a water-tight seal acting as a water block against longitudinal migration of water along the pipe between surfaces 120 and 128 and surfaces 122 and 124.

Figure 9:
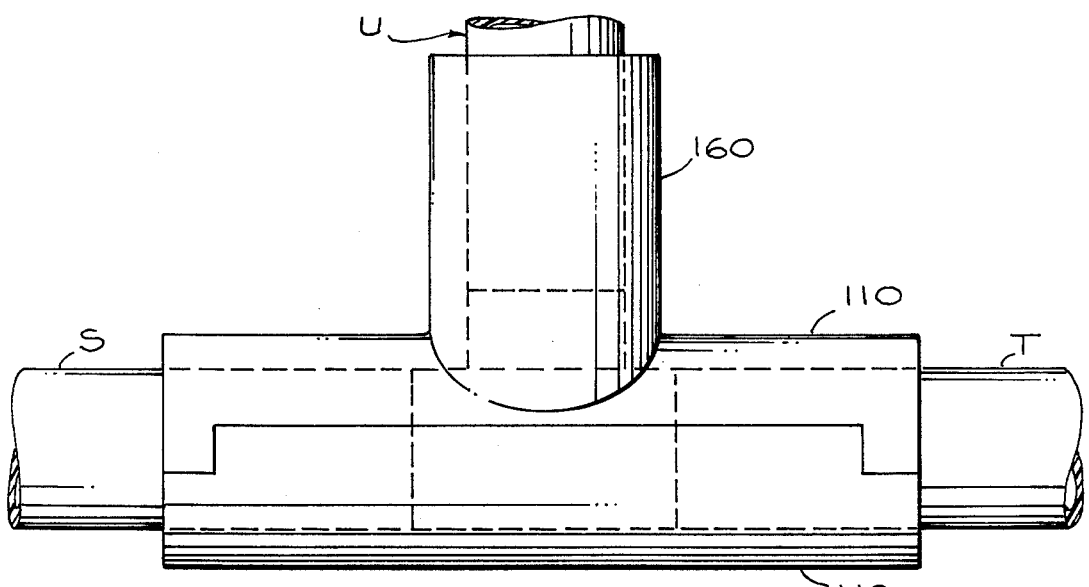
FIG. 9 is an elevation view of a coupling constructed in accordance with yet another embodiment of the invention showing a "T"-type connection joining three pipes.

FIG. 9 illustrates a further embodiment of the invention which is similar to that depicted in FIGS. 7 and 15 but differs therefrom in that part 110 has female nipple 160 extending perpendicular to the centerline of pipes S and T. Nipple 160 can have a smooth inner wall for accepting unthreaded pipe U which is bonded in place with a suitable solvent-type cement or can be threaded to accept a threaded riser.

Figure 10:
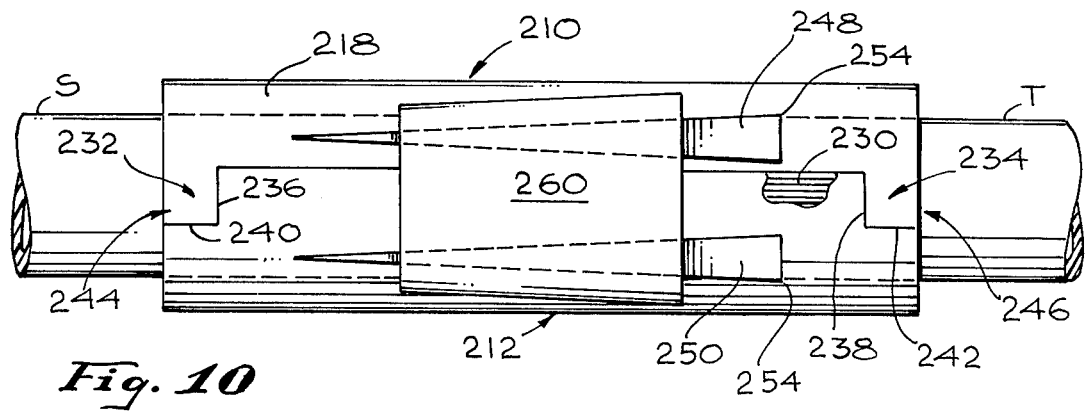
FIG. 10 is an elevation view of a coupling in accordance with yet another embodiment of the invention also comprised of mating semi-cylindrical pipe sections.
Figure 11:
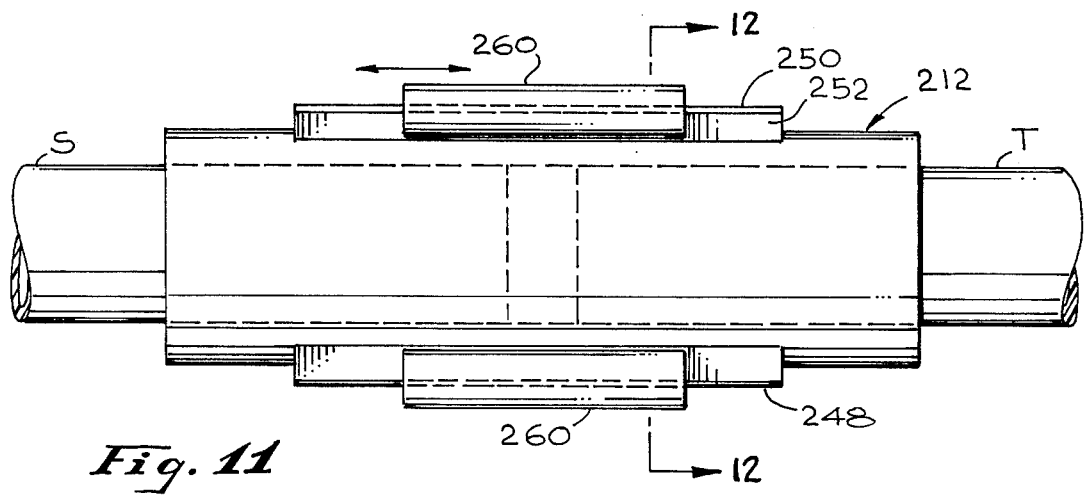
FIG. 11 is a top view of FIG. 10.
Figure 12:
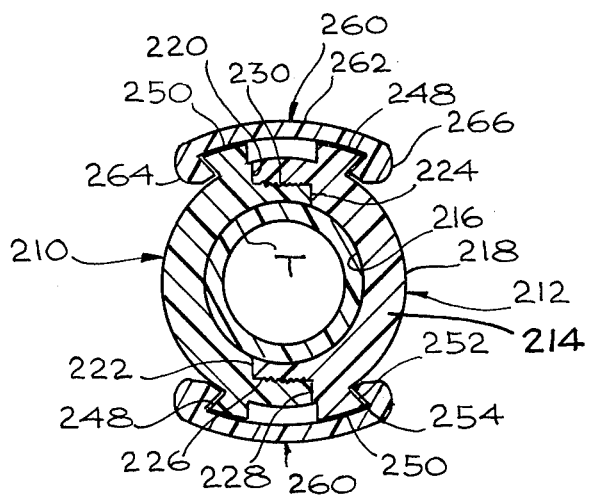
FIG. 12 is a sectional view taken substantially along the plane 12—12 of FIG. 11 showing the way in which the keepers grip the projections of the mating semi-cylindrical pipe sections.

FIGS. 10, 11 and 12 illustrate a further embodiment of the invention whcih is similar to that depicted in FIGS. 8 and 9 but differs therefrom in the manner in which the semi-cylindrical parts are held together during the bonding process.

The semi-cylindrical pipe sections 210 and 212 are identical and each is formed by a wall 214 having inner and outer semi-cylindrical surfaces, 216 and 218, and first and second longitudinal edges 220 and 222. A shoulder 224 is formed proximate to the longitudinal edge 220 and extends between the inner surfaces 216 and exposed surface 230. A shoulder 228 is formed between the outer surface 218 and an exposed surface 226. The exposed surfaces 230 and 226 extend substantially parallel to one another and preferably lie on a tangent to a concentric circular path about the axis of the pipe section.

The notch and lug configuration of pipe sections 210 and 212 are the same as has been discussed for pipe sections 110 and 112 of FIGS. 7-9. Thus, the wall 214 of pipe section 210, as can best be seen in FIG. 10, is shaped to define lugs 232 and 234 adjacent to each end of the semi-cylindrical section. More particularly, surface 230 and pipe section 210 extend to, and terminate at, shoulders 236 and 238, which shoulders define the inner boundaries of the lugs. The lugs 232 and 234 respectively have terminal surfaces 240 and 242 extending parallel to the axis of the pipe section and perpendicular to the shoulders 236 and 238 respectively.

Whereas projecting lugs 232 and 234 are formed adjacent to the ends of exposed surface 230, notches 244 and 246 are formed in the pipe section adjacent to the ends of exposed surface 226 along edge 220.

Each of the pipe sections 210 and 212 has a pair of elongated projections 248 and 250 formed on the outer surface 218 thereof extending substantially parallel to the longitudinal axis of the pipe sections. The projections 248 and 250 are substantially triangular in cross section (FIG. 12) and include a surface 252 extending outwardly from outer surface 218 and terminating at edge 254. Edges 254 are canted relative to one another so as to diverge proceeding along the pipe sections from left to right as viewed in FIG. 10.

When the pipe sections 210 and 212 are mated to one another as depicted in FIG. 19, projection 248 on section 212 lies proximate to projection 250 on section 210 on opposite sides of the boundary between the sections. A U-shaped keeper 260 is provided for bridging the projections 248 and 250 to squeeze the edges of pipe sections 210 and 212 together.

More particularly, the keeper 260 includes a bight portion 262 and a pair of legs 264 and 266 adapted to wrap around and engage edges 254 to force the adjacent edges of the pipe sections together as the keeper 260 is slid along the projections to the right as viewed in FIG. 10. In use, a suitable adhesive is applied to the mating edges of the pipe sections prior to placing the keeper 260 on the projections. The keeper is then slid along the diverging edges 254 to apply an increasing clamping force to the wetted surfaces to thus assure the formation of a good water-tight seal.

Whereas in the embodiment of FIGS. 7-9, the teeth 131 on exposed surfaces 126 and 130 are necessary to hold the sections 110 and 112 together while the adhesive is drying, in the embodiment of FIGS. 10-12, the teeth can be deleted, if desired, since the keeper 260 clamps the sections 210 and 212 together.

Although particular embodiments of the invention have been described and illustrated herein, it is recognized that modifications and variations may readily occur to those skilled in the art and consequently it is intended that the claims be interpreted to cover such modifications and equivalents.

The embodiments of the invention in which an exclusive property or privilege is claimed are defined as follows:

1. A device suitable for being adhered directly to first and second pipes of predetermined diameter having open ends spaced by less than a predetermined distance to form a water tight seal therebetween, said device comprising:

first and second pipe sections each comprised of a substantially semi-cylindrically shaped wall having first and second longitudinal edges and an outer circumferential surface extending from said first edge to a first shoulder extending parallel to and spaced from said second edge and an inner circumferential surface for adhesion directly to said pipes extending from said second edge to a second shoulder extending parallel to and spaced from said first edge, said wall being of substantially uniform thickness between said first and second shoulders and of reduced thickness between said first shoulder and said second edge and between said second shoulder and said first edge;

each of said pipe sections further including at least two longitudinally spaced lugs formed integral with said wall and extending circumferentially beyond one of the longitudinal edges thereof, and at least two notches formed in said wall extending circumferentially inwardly from the other longitudinal edge thereof;

said lugs and notches being longitudinally aligned whereby said first and second pipe sections can be mated to one another and around said pipes with the lugs of each section received in the notches of the other section and with the reduced thickness wall portions of each section overlapping the reduced thickness wall portions of the other section, the degree of overlapping being dependent upon the extent to which the diameters of said pipes differ from said predetermined diameter, each of said lugs having a mating surface projecting circumferentially beyond the longitudinal edge from which the lug extends and each of said notches having a mating surface projecting circumferentially inwardly from the longitudinal edge from which the notch extends, said lug and notch mating surfaces being oriented so as to remain substantially in contact with one another for varying degrees of said overlapping whereby said mating surfaces can be adhered to one another.

2. The device of claim 1 wherein each section further includes a first exposed surface extending circumferentially between said first longitudinal edge and said second shoulder and a second exposed surface extending circumferentially between said second longitudinal edge and said first shoulder; and teeth respectively formed on said first and second exposed surfaces for interlocking said surfaces of said first and second pipe sections one to the other.

3. The device of claim 1 wherein said pipe sections are formed of a material which is readily dissolved by a solvent which also dissolves the material of said first and second pipes.

4. The device of claim 1 wherein said wall inner surface is substantially smooth and readily dissolvable by a solvent which also dissolves the material of said first and second pipes.

5. The device of claim 1 including elongated projections formed on the outer surfaces of said first and second pipe sections, said projections defining edges diverging from one another along the length of said pipe sections; and means extending between projections in said first and second pipe sections and moveable along said diverging edges to clamp said pipe sections together.

6. The device of claim 1 wherein said lug and notch mating surfaces extend perpendicularly from said longitudinal edges.

7. A device suitable for being adhered directly to first and second pipes of predetermined diameter having open ends spaced by less than a predetermined distance to form a water-tight seal therebetween, said device comprising:

first and second pipe sections each comprised of a substantially semi-cylindrically shaped wall having inner and outer circumferential surfaces, each of said pipe sections including a portion of reduced wall thickness adjacent a first longitudinal edge thereof extending radially inwardly from said outer circumferential surface and a portion of reduced wall thickness adjacent a second longitudinal edge thereof extending radially outwardly from said inner circumferential surface whereby said first and second pipe sections can be mated to one another and around said pipes to form a cylinder with the reduced thickness wall portions of each section overlapping the reduced thickness wall portions of the other section, the degree of overlapping being dependent upon the extent to which the diameters of said pipes differ from said predetermined diameter;

each of said pipe sections further including at least two longitudinally spaced lugs extending circumferentially from one of the longitudinal edges thereof, each lug having a mating surface projecting circumferentially from and perpendicular to the longitudinal edge from which the lug extends;

each of said pipe sections further including at least two longitudinally spaced notches extending circumferentially from the other of said longitudinal edges, each notch having a mating surface projecting circumferentially from and perpendicular to the longitudinal edge from which the notch extends, said lug and notch mating surfaces being oriented to remain contiguous to one another for varying degrees of said overlapping whereby said mating surfaces can be adhered to one another.

* * * * *